(12) United States Patent
Mandeville et al.

(10) Patent No.: US 10,882,554 B2
(45) Date of Patent: Jan. 5, 2021

(54) WALK BEHIND POWER EQUIPMENT WITH TIGHT TURNING CAPABILITY

(71) Applicant: HUSQVARNA AB, Huskvarna (SE)

(72) Inventors: Kenneth Mandeville, Weddington, NC (US); Mike Johnson, Charlotte, NC (US); Matt King, Mooresville, NC (US)

(73) Assignee: HUSQVARNA AB, Huskvarna (SE)

( * ) Notice: Subject to any disclaimer, the term of this patent is extended or adjusted under 35 U.S.C. 154(b) by 188 days.

(21) Appl. No.: 16/080,680

(22) PCT Filed: Feb. 27, 2017

(86) PCT No.: PCT/IB2017/051146
§ 371 (c)(1),
(2) Date: Aug. 29, 2018

(87) PCT Pub. No.: WO2017/149439
PCT Pub. Date: Sep. 8, 2017

(65) Prior Publication Data
US 2019/0071122 A1    Mar. 7, 2019

Related U.S. Application Data

(60) Provisional application No. 62/301,093, filed on Feb. 29, 2016.

(51) Int. Cl.
*B62D 11/08* (2006.01)
*B62D 51/06* (2006.01)
(Continued)

(52) U.S. Cl.
CPC ............ *B62D 11/08* (2013.01); *B62D 51/004* (2013.01); *B62D 51/06* (2013.01); *E01H 5/045* (2013.01); *F16D 67/02* (2013.01)

(58) Field of Classification Search
CPC ....... B26D 11/06–11/186; B26D 51/04; B26D 51/06; E01H 5/04–5/098; F16D 67/02
(Continued)

(56) References Cited

U.S. PATENT DOCUMENTS 2,196,458 A   4/1940   Flynn et al.
5,012,907 A   5/1991   Fujioka et al.
(Continued)

FOREIGN PATENT DOCUMENTS

WO    2016/046783 A1    3/2016

OTHER PUBLICATIONS

International Search Report and Written Opinion for International Application No. PCT/IB2017/051146 dated Jun. 9, 2017.
(Continued)

*Primary Examiner* — Richard M Lorence
(74) *Attorney, Agent, or Firm* — Burr & Forman, LLP

(57) ABSTRACT

A drive assembly for a walk-behind, powered device operably couples an engine of the powered device to a mobility assembly to provide mobility of the powered device responsive at least in part to operation of the engine. The drive assembly includes a transmission shaft and a short turning assembly. The transmission shaft selectively receives drive power operably coupled from the engine to drive a first drivable component and a second drivable component of the mobility assembly. The first and second drivable components are disposed substantially at opposite sides of the powered device. The short turning assembly is configured to cause both disengagement of drive power and activation of braking to the first drivable component while drive power is provided to the second drivable component.

21 Claims, 6 Drawing Sheets

(51) Int. Cl.
*B62D 51/00* (2006.01)
*E01H 5/04* (2006.01)
*F16D 67/02* (2006.01)

(58) Field of Classification Search
USPC .......................................................... 180/19.3
See application file for complete search history.

(56) References Cited

U.S. PATENT DOCUMENTS

| | | | |
|---|---|---|---|
| 5,018,592 | A | 5/1991 | Buchdrucker |
| 6,098,385 | A | 10/2000 | Turk |
| 6,155,033 | A * | 12/2000 | Wians ................ A01D 34/6806 56/11.1 |
| 6,185,920 | B1 | 2/2001 | Oxley |
| 2002/0148114 | A1 | 10/2002 | Ruebusch et al. |
| 2002/0170797 | A1 | 11/2002 | Cox |
| 2006/0150444 | A1 | 7/2006 | Friberg et al. |
| 2009/0159392 | A1 | 6/2009 | Vaughn et al. |

OTHER PUBLICATIONS

International Preliminary Report on Patentability for International Application No. PCT/IB2017/051146 dated Sep. 4, 2018.

\* cited by examiner

WALK BEHIND POWER EQUIPMENT WITH TIGHT TURNING CAPABILITY

CROSS REFERENCE TO RELATED APPLICATION

This application claims priority to U.S. application No. 62/301,093 filed Feb. 29, 2016, the entire contents of which are expressly incorporated within in its entirety.

TECHNICAL FIELD

Example embodiments generally relate to outdoor power equipment and, more particularly, relate to walk behind power equipment that can be provided with a tight turning capability.

BACKGROUND

Grounds care/yard maintenance and other outdoor tasks associated with grooming and maintaining property are commonly performed using various tools and/or machines that are configured for the performance of corresponding specific tasks. Certain tasks, like snow removal, are typically performed by snow removal equipment such as snow blowers or snow throwers. The snow removal equipment may, in some cases, be operated by a user that walks behind the equipment and is therefore considered walk-behind equipment. However, snow blower or snow thrower attachments can sometimes be added to lawn tractors or other riding yard maintenance vehicles as well.

Walk-behind snow blowers may be easier to operate and control with a mobility assembly that is powered. Thus, for example, power may be provided from the engine to turn not only the snow removal system of the snow blower, but also power the wheels or tracks via which the snow blower moves. In some cases, a binary (on/off) application of power may be considered to be sufficient. However, some devices may be operated in locations where more control is desirable and where tight turns are needed. In such environments, a binary application of power is less useful. If power is applied during the turn, it may be difficult to do anything other than a wide turn. Meanwhile, if power is not applied, the operator may be required to exert a large amount of force to cause a tighter turn.

BRIEF SUMMARY OF SOME EXAMPLES

Some example embodiments may therefore provide the ability to give operators a greater degree of control with respect to powered driving of the mobility assembly of a walk behind, powered device. In this regard, for example, some example embodiments may provide a zero turn or other tight turn radius capability for such devices. However, such capability may be provided via a mechanical solution that, for example, applies a braking force to one side of the mobility assembly (e.g., an inside wheel) while drive power is provided to the other side (e.g., the outside wheel) to enable the device to be turned with a small turn radius.

In one example embodiment, a drive assembly for a walk-behind, powered device is provided. The drive assembly couples an engine of the powered device to a mobility assembly to provide mobility of the powered device responsive at least in part to operation of the engine. The drive assembly includes a transmission shaft and a short turning assembly. The transmission shaft selectively receives drive power operably coupled from the engine to drive a first drivable component and a second drivable component of the mobility assembly. The first and second drivable components are disposed substantially at opposite sides of the powered device. The short turning assembly is configured to cause both disengagement of drive power and activation of braking to the first drivable component while drive power is provided to the second drivable component.

In another example embodiment, a walk-behind, powered device is provided. The powered device includes an engine, a mobility assembly operably coupled to the engine to provide mobility of the powered device responsive at least in part to operation of the engine, a working assembly operably coupled to the engine to perform a working function responsive at least in part to operation of the engine, and a drive assembly operably coupling the engine to the mobility assembly to selectively provide first drive power or second drive power to the mobility assembly. The mobility assembly includes a first drivable component and a second drivable component. The first and second drivable components may be disposed substantially at opposite sides of the powered device. The drive assembly is configured to selectively and independently provide power to the first and second drivable components. The drive assembly includes a short turning assembly configured to cause both disengagement of drive power and activation of braking to the first drivable component while drive power is provided to the second drivable component.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
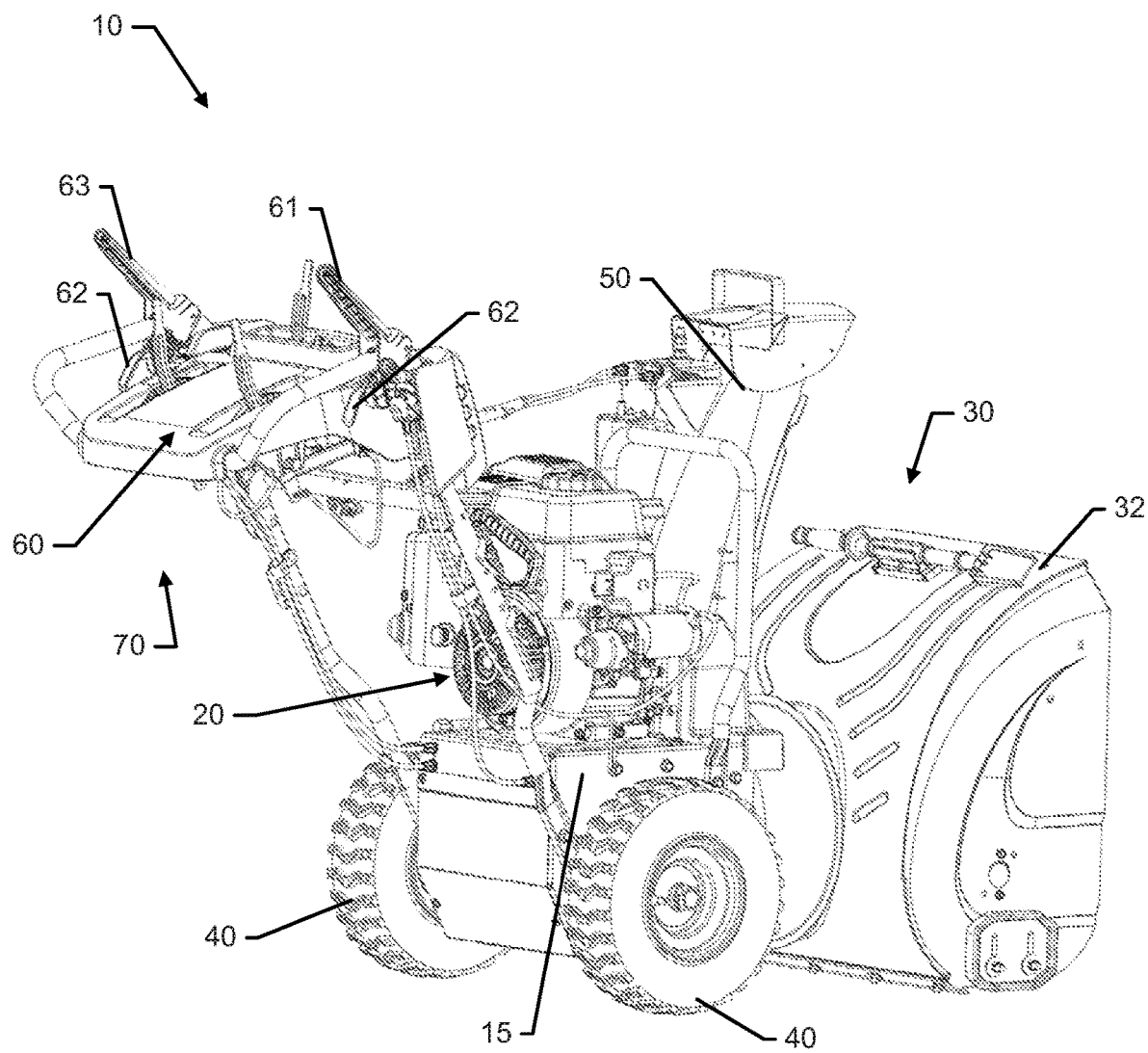
FIG. 1 illustrates a perspective view of a snow removal device according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

For a snow blower, or other walk behind device for which powered mobility is desired, the device may be configured to enable selective coupling to one or more of the wheels of the device. To improve the turn radius of the device, the application of power to one wheel may be stopped while the application of power to the other wheel continues. The uneven application of power to the wheels may allow for a tighter turn. However, to enable even tighter turning, example embodiments may apply a braking force to one wheel while applying forward power to the other wheel. Accordingly, some example embodiments described herein provide a mechanism by which to selectively apply braking forces to an inner wheel during a turn while continuing to provide forward drive power to the outside wheel when zero turn capability or tight turning capability is desired.

FIG. 1 illustrates an example of a walk behind, powered device in the form of a snow removal device 10. Although the snow removal device 10 of FIG. 1 is shown as a walk-behind snow removal device (i.e., a snow blower or snow thrower), it should be appreciated that example embodiments could be employed in connection with other walk behind power equipment as well, such as tillers, mowers, edgers, and/or the like.

In some embodiments, the snow removal device 10 may include a chassis 15 or frame to which various components of the snow removal device 10 may be attached. For example, the chassis 15 may support an engine 20, such as a gasoline powered engine, and a working assembly 30. Operation of the engine 20 may be initiated by a recoil starter via pulling of a recoil starter handle by the operator. However, in other embodiments, the engine 20 may alternatively be started via a key, switch or other similar device.

The snow removal device 10 may include wheels 40 or continuous tracks forming a mobility assembly on which a substantial portion of the weight of the snow removal device 10 may rest, when the snow removal device 10 is stationary. The mobility assembly (e.g., the wheels 40 or continuous tracks) may also provide for mobility of the snow removal device 10. In some cases, the mobility assembly may be driven via power from the engine 20. However, in other cases, the mobility assembly may simply provide for mobility of the snow removal device 10 responsive to pushing by the operator. In other words, for example, the mobility assembly may be an active or passive provider of mobility for the snow removal device 10. As will be discussed below, in some embodiments, the mobility assembly may selectively provide forward or reverse power to each of the wheels 40. The selective provision of power to the wheels 40 means that, for example, one wheel could be powered while the wheel on the opposite side is not powered. However, in some cases, braking forces may also be provided to the wheel that is not powered to improve the ability of the operator to control a tight turn with minimal physical effort. This feature may enhance turning capabilities and general control capabilities for the snow removal device 10.

In this example, the working assembly 30 is a dual stage snow thrower. As such, the working assembly 30 includes a rotatable auger (or auger blade) that is configured to work (e.g., spin, rotate, turn, and/or the like) in order to direct snow toward an impeller (or impeller blade) that also works (e.g., spins, rotates, turns, and/or the like) to direct snow toward a discharge path to be ejected from the snow removal device 10. However, it should be appreciated that the working assembly 30 of some embodiments could include a power brush or other implement used to move snow toward a second stage device (e.g., the impeller) for ejection from the working assembly 30. The working assembly 30 could also include a single stage auger or impeller or structures for performing another work function (e.g., a blade for mowing or edging, or a tine assembly for tilling). In an example embodiment, the working assembly 30 may be powered via operable coupling to the engine 20. The operable coupling of the working assembly 30 to the engine 20 may be selectively engaged and/or disengaged (e.g., via a clutch, one or more selectively engageable chains/belts/pulleys, a friction wheel or other similar devices). Components of the working assembly 30 (e.g., the auger and the impeller) may be housed in a bucket assembly 32.

As can be appreciated from FIG. 1, the bucket assembly 32 prevents escape of snow and directs the snow into the ejection path. Thus, the bucket assembly 32 also protects the operator from blowback and allows for a somewhat orderly disposal of the snow that is ejected by the snow removal device 10. The ejection path of the snow removal device 10 may be formed at least in part by the bucket assembly 32 and a discharge chute 50. As such, for example, the ejection path may begin proximate to an input of the impeller, at which point snow is imparted with momentum at an output of the impeller to be pushed toward, and ultimately through, the discharge chute 50.

In an example embodiment, the snow removal device 10 may further include a control panel 60, which may include ignition controls, operating levers (e.g., operating triggers 62) and/or other controls or informational gauges. The control panel 60 may be provided to be accessible from the rear of the powered device 10 by an operator standing or walking behind the snow removal device 10 (e.g., at an operating station) and capable of pushing, steering or otherwise controlling movement of the snow removal device 10 using a handlebar assembly 70 or some other steering assembly. In some examples, various ones of the operating triggers 62 may be employed to control various components of the mobility assembly and/or the working assembly 30. As such, for example, different ones of the operating triggers 62 may be operably coupled to various components to enable remote operator control of the respective components. In an example embodiment, operation of the operating triggers 62 may selectively engage or disengage drive power to the wheel on the same side as the corresponding operating trigger 62. Moreover, in some cases, operation of the operating triggers 62 may initiate braking as described in greater detail below. Thus, for example, the operating triggers 62 may be examples of a remote actuator capable of a single actuation to both remove drive power and simultaneously apply braking power to one of the drivable components as discussed in greater detail below.

The operation of the auger and/or impeller, application of drive power to the wheels 40 and the implementation of a mechanical power reversing assembly as described below are just a few examples of some of components that can be controlled by an operator at the control panel 60. In some cases, the control panel 60 may include an auger control lever 61 to engage auger motion to cause snow throwing. In an example embodiment, the control panel 60 may also include a traction drive control lever 63 to engage power-propelled forward or reverse motion of the snow removal device 10.

Figure 2:
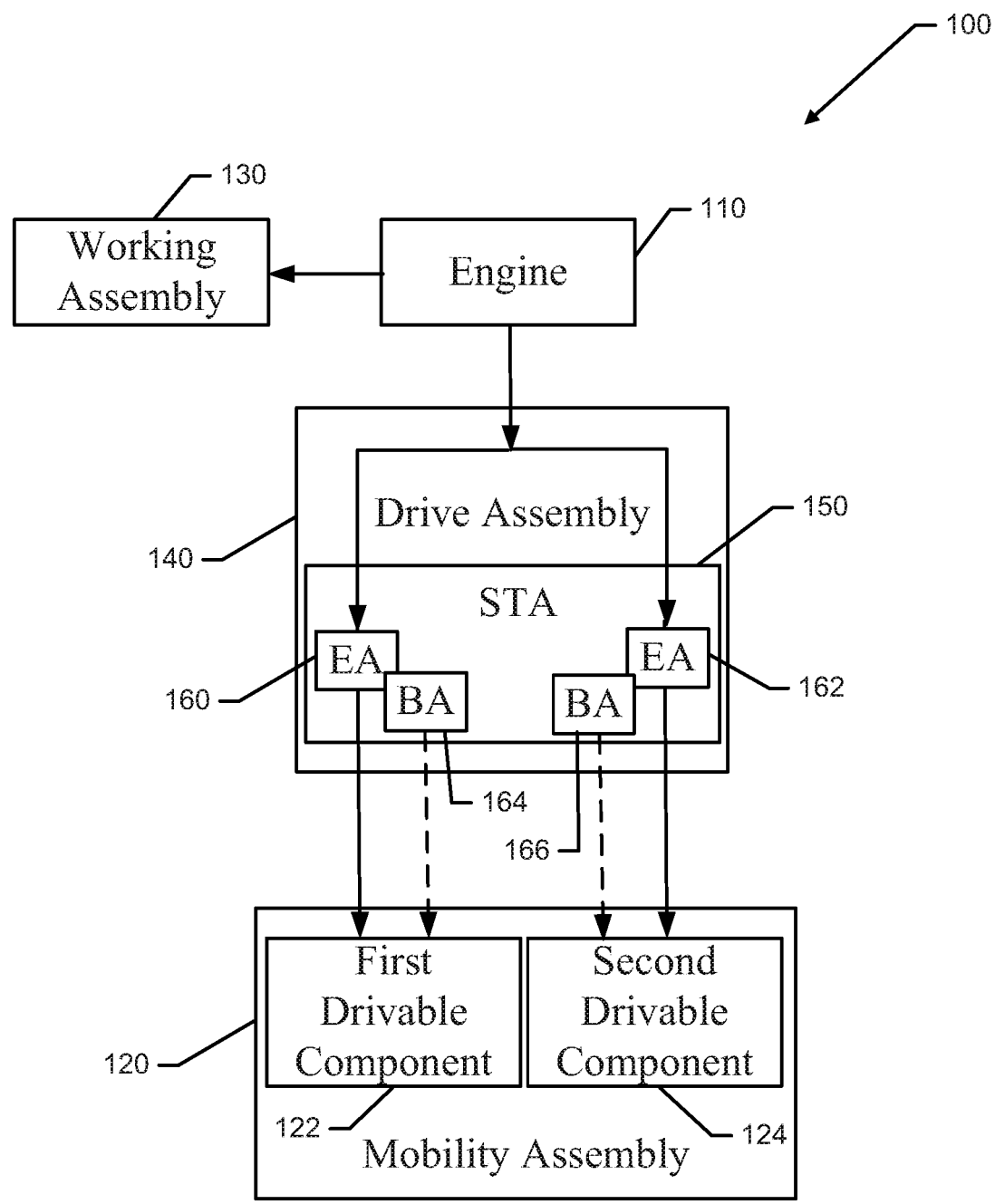
FIG. 2 illustrates a block diagram of a walk-behind, powered device according to an example embodiment.

Since, as indicated above, the snow removal device 10 of FIG. 1 is merely one example of a device on which example embodiments may be practiced, FIG. 2 is provided to facilitate a more general description of devices on which an example embodiment may be practiced. In this regard, FIG. 2 illustrates a block diagram of a powered device 100 in accordance with an example embodiment. It should be appreciated that the snow removal device 10 is one specific example of the powered device 100.

As shown in FIG. 2, the powered device 100 may include an engine 110 and a mobility assembly 120. The mobility assembly 120 may be operably coupled to the engine 110 to enable the powered device 100 to move over a ground surface upon which the powered device 100 is operable. Although the mobility assembly 120 may enable the operator to move the powered device 100 without power being applied to the mobility assembly 120 from the engine 110 (e.g., when the operator pushes the powered device 100), the engine 110 may at least be capable of providing power to the mobility assembly 110. The engine 20 described above is one example of the engine 110 of FIG. 2.

The mobility assembly 120 may include a first drivable component 122 and a second drivable component 124. The first and second drivable components 122 and 124 may be wheels (e.g., the wheels 40 of FIG. 1), continuous tracks, or any other suitable components that can be powered to cause the powered device 100 to move over the ground. In an example embodiment, the first and second drivable components 122 and 124 may be provided on a drive shaft that may include a bush/sleeve or other component to split the drive shaft so that each of the first and second drivable components 122 and 124 is independently drivable. As such, the first and second drivable components 122 and 124 may be provided on opposite sides of the powered device 100.

The powered device 100 may further include a working assembly 130 (an example of which is the working assembly 30 of FIG. 1). The working assembly 130 may be operably coupled to the engine 110 to perform a working function responsive at least in part to operation of the engine 110. As mentioned above, the working assembly 130 could perform working functions such as snow removal, mowing, edging, tilling and/or the like.

In an example embodiment, the powered device 100 may further include a drive assembly 140 that may provide the operable coupling between the engine 110 and the mobility assembly 120. The drive assembly 140 may include a transmission, friction drive, and/or other components (e.g., a hydraulic system) configured for transferring power from the engine 110 to the mobility assembly 120. As such, the drive assembly 140 may selectively provide forward drive power or reverse drive power to the mobility assembly. In this regard, more specifically, the drive assembly 140 may transfer rotary power through a series of gears, frictionally engaged components, and/or the like to the first and second drivable components 122 and 124 to turn the first and second drivable components in a desired direction (i.e., forward or reverse). In a first configuration, the drive assembly 140 may provide no power to either of the first and second drivable components 122 and 124 (so the operator can push the powered device 100), or provide power to both of the first and second drivable components 122 and 124, simultaneously in the same direction (i.e., forward or reverse). While it is also possible to provide power to only one of the first or second drivable components 122 and 124 while no power is provided to the other, some example embodiments may further provide the ability to provide braking forces simultaneously to the first drivable component 122 while drive power is being provided to the second drivable component 124 (or vice versa). Providing combined braking and power in this manner may enable a very tight turn capability (e.g., a near zero turning radius). Accordingly, it should be appreciated that the drive assembly 140 is configured to selectively and independently provide power and braking to the first and second drivable components 122 and 124.

In accordance with an example embodiment, the drive assembly 140 includes a short turning assembly (STA) 150 that is configured to be employed for the tight (or near zero) turn capability described above. Accordingly, instead of simply providing forward power to the first drivable component 122 with a power source operating in a forward direction while applying no power to the second drivable component 124, the STA 150 can be employed to allow the forward drive power to be generated for the first drivable component 122 while power is simultaneously removed from the second drivable component 124 and braking forces are applied to the second drivable component 124. The STA 150 of an example embodiment therefore allows a single operation (e.g., one of the operating triggers 62) to remove drive power and simultaneously apply braking power to a corresponding one of the drivable components. Thus, a single actuation of an operator can be employed to both remove the power being routed to drive one drivable component and apply a braking force to the drivable component (while the drivable component on the other side can remain powered). The STA 150 therefore typically remains in a normal (non-actuated) state. Actuation of the STA 150 then impacts the provision of drive power and braking to one drivable component while the other drivable component remains powered.

FIG. 2 illustrates how the STA 150 is employed to use a single actuation of an operator to both remove the power being routed to drive one drivable component in a first direction and apply a braking force to the drivable component in accordance with an example embodiment. In this regard, the STA 150 further includes a first engagement assembly (EA) 160 and a second EA 162 that are each capable of being in an engaged state or a disengaged state. When the first and second EAs 160 and 162 are both in their engaged states, the solid lines connecting the drive assembly 140 to the first and second drivable components 122 and 124 are active (or engaged) and power is driven through the drive assembly 140 to each of the first and second drivable components 122 and 124. However, for example, if the first EA 160 is disengaged by actuation of a corresponding one of the operating triggers 62, then the STA 150 operates such that the solid line connecting the first EA 160 to the first drivable component 122 (e.g., an inside wheel) is no longer active (or engaged). Meanwhile, the second EA 162 remains engaged and power is therefore transferred through the second EA 162 to the second drivable component 124 (e.g., an outside wheel).

Moreover, the operation of the corresponding one of the operating triggers 62 also actuates a first brake assembly (BA) 164 so that the dashed line between the first BA 164 and the first drivable component 122 is activated or actuated to apply a braking force from the first BA 164 to the first drivable component 122. Meanwhile, a second BA 166 corresponding to the second EA 162 is not actuated so that no braking force is applied between the second BA 166 and the second drivable component 124. The second drivable component 124 therefore continues to be powered and the first drivable component 122 is both unpowered and has a braking force simultaneously applied thereto. As such, the STA 150 allows simultaneous powering of one wheel while power is both removed and a braking force is applied to the other wheel.

The process described above can be reversed for a turn in the opposite direction. In other words, a corresponding operating trigger 62 may be actuated to remove drive power through the second EA 162 while the second BA 166 applies a braking force to the second drivable component 124. Meanwhile, the first EA 160 may remain engaged to power the first drivable component 122 while the first BA 164 does not apply any braking force to the first drivable component 122. Thus, the STA 150 essentially allows one drivable component to be driven while the other is both not driven and, is actually slowed or stopped by the application of a braking force.

In some cases, the STA 150 may be an assembly of parts that include some parts shared between both sides of the drive assembly 140 and some parts that interact with only one of the first and second drivable components 122 and 124. Thus, it should be appreciated that various components of FIG. 2, can be embodied in various different ways and with various different structures. FIGS. 3-6 illustrate some examples of certain component structures that may be employed to embody the powered device 100 of FIG. 2.

Figure 3:
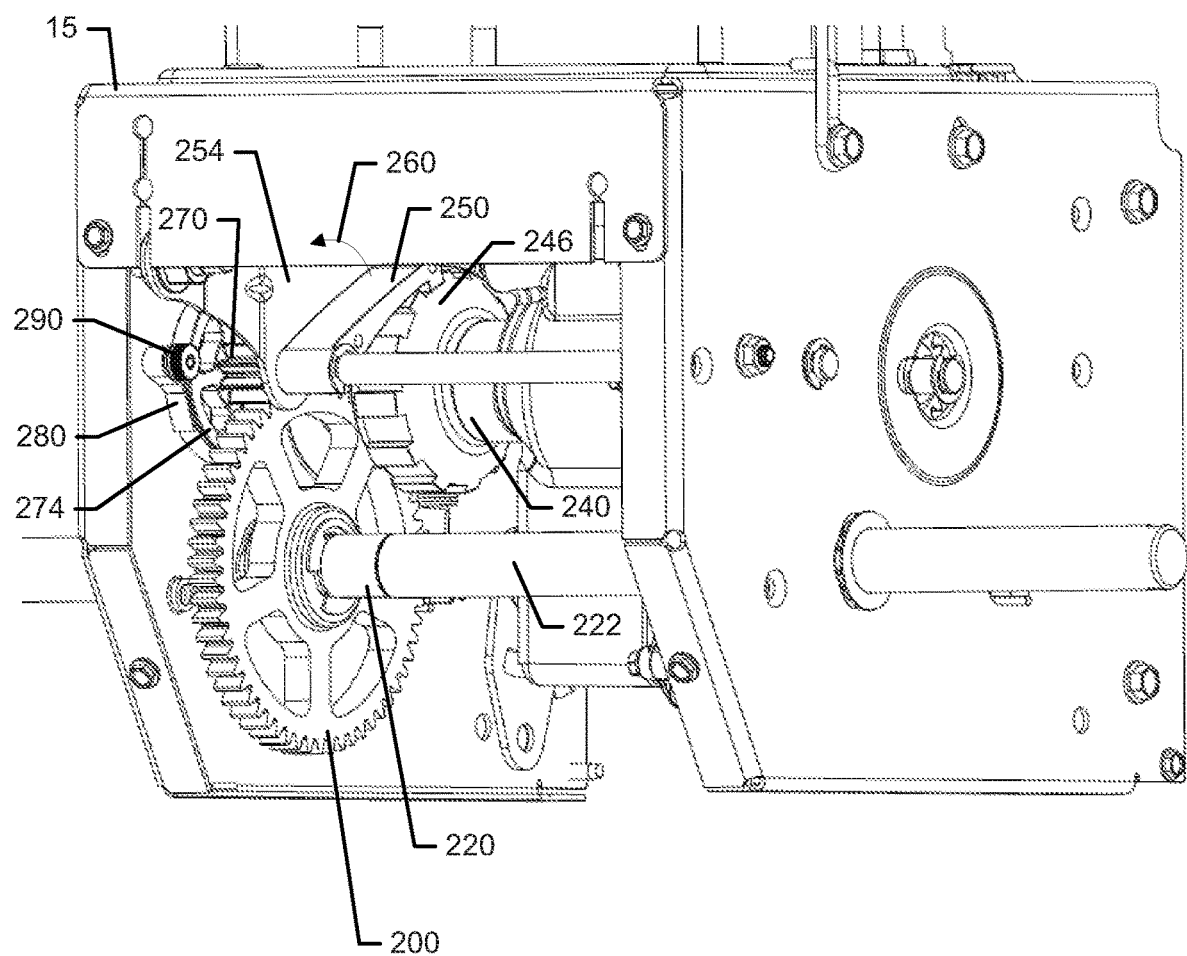
FIG. 3 illustrates a perspective view of various example components of a drive assembly inside a chassis of the snow removal device according to an example embodiment.
Figure 4:
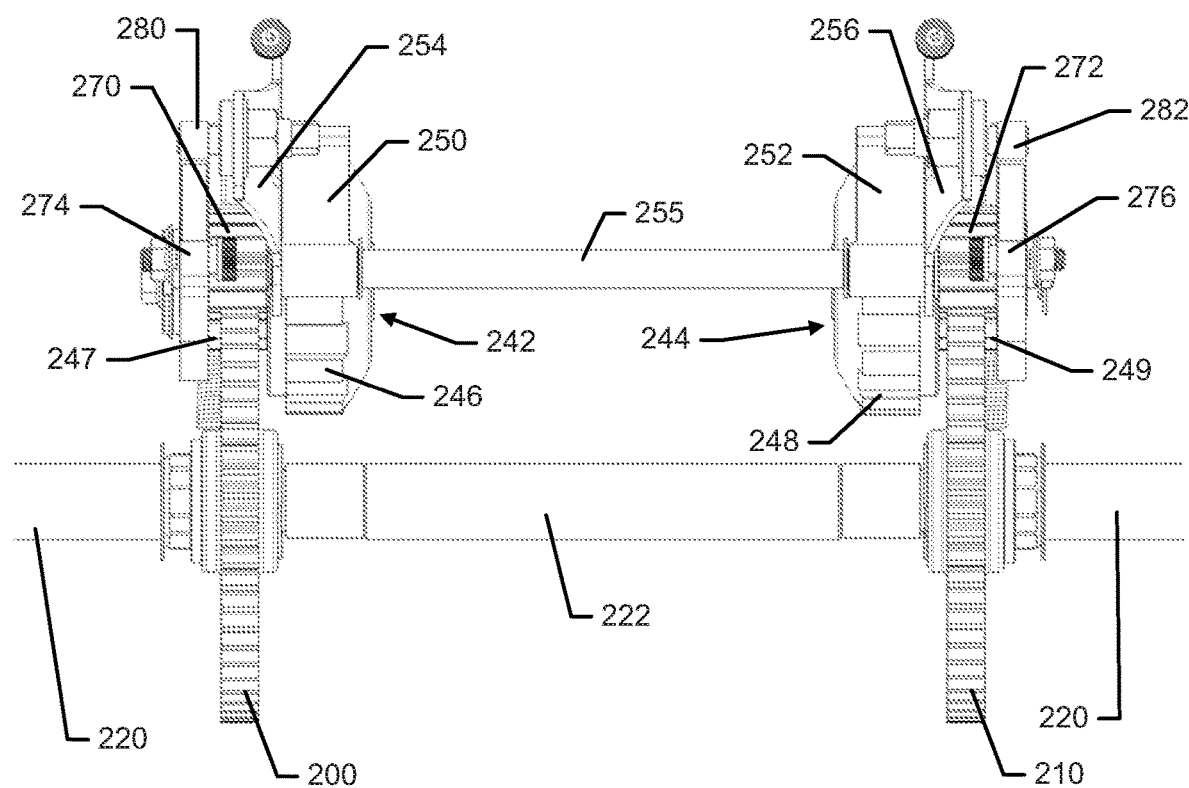
FIG. 4 illustrates a rear view of some of the components of FIG. 3 with the chassis removed according to an example embodiment.
Figure 5:
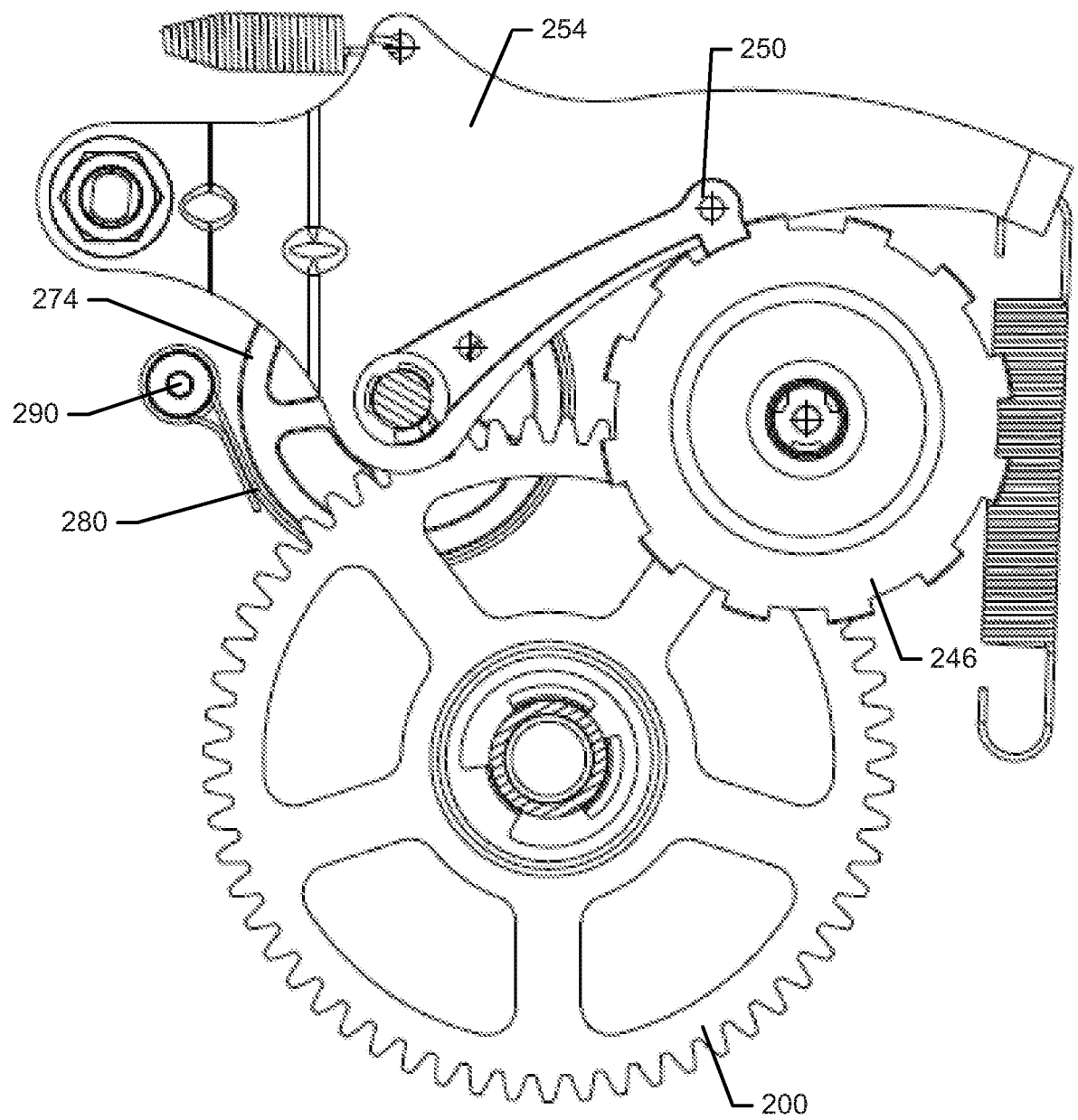
FIG. 5 is a side view (looking outward from a centerline of the snow removal device) of components of the drive assembly according to an example embodiment.
Figure 6:
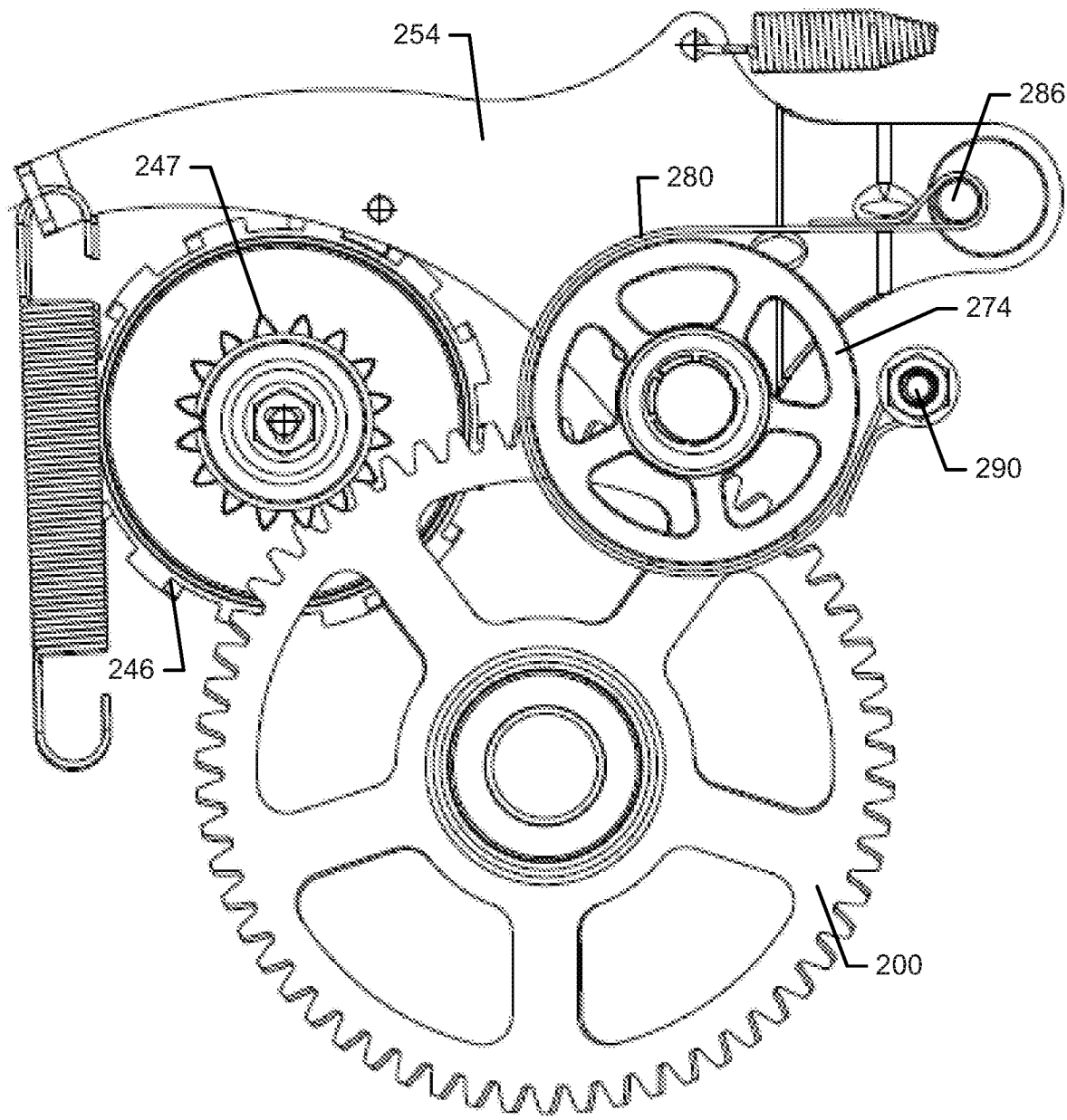
FIG. 6 is a side view (looking inward from outside of the chassis) of components of the drive assembly with the chassis removed according to an example embodiment.

In this regard, FIG. 3 illustrates a perspective view of various example components of the drive assembly 140 inside the chassis 15 (or frame/housing) of the snow removal device 10 of FIG. 1. FIG. 4 illustrates a rear view of some of the components of FIG. 3 with the chassis 15 removed. FIG. 5 is a side view (looking outward from a centerline of the snow removal device 10) of components of the drive assembly 140 according to an example embodiment. FIG. 6 is a side view (looking inward from outside of the chassis 15) of components of the drive assembly 140 with the chassis 15 removed according to an example embodiment.

As shown in FIG. 3, the mobility assembly (e.g., first and second drivable components 122 and 124 or wheels 40) are driven via respective drive gears (e.g., first drive gear 200 and second drive gear 210) that are carried on a drive shaft 220. The drive shaft 220 may include a sleeve/bush 222 or other component that enables the respective drive gears to be independently powered. As such, the drive shaft 220 is functionally split into left and right stub shafts at the sleeve/bush 222.

The drive assembly 140 may include a flywheel (not shown) that is powered by the engine 20. The flywheel may frictionally engage a friction wheel that is carried on a transmission shaft 240. When the friction wheel engages the flywheel away from the center of the flywheel, the friction wheel may rotate and turn the transmission shaft 240. The first and second EAs 160 and 162 may be operably coupled to the transmission shaft 240 on opposite ends thereof, and may include first and second transmission gear sets 242 and 244, respectively. The first and second transmission gear sets 242 and 244 may each include a ring gear (e.g., first ring gear 246 and second ring gear 248) that each house a planetary gear inside. The planetary gear inside each of the first and second transmission gear sets 242 and 244 may be operably coupled to drive a corresponding spur gear (e.g., first spur gear 247 of FIG. 6 and a second spur gear 249 (see FIG. 4) for the second drive gear 210) that engages a respective one of the first and second drive gears 200 and 210.

In an example embodiment, a first pawl 250 and a second pawl 252 interface with the first and second transmission gear sets 242 and 244 to selectively engage or disengage the first and second transmission gear sets 242 and 244 (and thereby engage or disengage their respective EAs as described above in reference to FIG. 2). When the first pawl 250 and second pawl 252 engage the first ring gear 246 and second ring gear 248, respectively, the first and second transmission gear sets 242 and 244 are each in an engaged state. The first pawl 250 and the second pawl 252 may each be operably coupled to a common shaft 255. The common shaft 255 may form an axis of rotation for the first pawl 250 and the second pawl 252, but the first and second pawls 250 and 252 may each be enabled to pivot or rotate about the common shaft 255 independent of one another. In the engaged state, the first ring gear 246 and the second ring gear 248 are held so that torque is driven through the planetary gears inside to the first spur gear 247 and second spur gear 249, respectively, which engage the first and second drive gears 200 and 210, respectively. The first and second drive gears 200 and 210 then rotate to turn respective portions of the drive shaft 220 and corresponding ones of the first and second drivable components 122 and 124, which are mounted on the drive shaft 220.

Referring, for example, to the first spur gear 247, it can be appreciated that when the transmission shaft 240 is turning (e.g., in the forward power direction), if the first pawl 250 is engaged, then the first ring gear 246 is held to drive torque through the planetary gear inside the first ring gear 246 to the first spur gear 247, turning the first spur gear 247. The first spur gear 247 then drives the first drive gear 200 and the corresponding wheel 40 (e.g., the first drivable component 122) is turned in the forward direction. Similarly, when the transmission shaft 240 is turning (e.g., in the forward power direction), if the second pawl 252 is engaged, then the second ring gear 248 is held to drive torque through the planetary gear inside the second ring gear 248 to the second spur gear 249, turning the second spur gear 249. The second spur gear 249 then drives the second drive gear 210 and the corresponding wheel 40 (e.g., the second drivable component 124) is turned in the forward direction.

The first pawl 250 and the second pawl 252 are each operably coupled to respective pivot arms (e.g., a first pivot arm 254 and a second pivot arm 256). The first and second pivot arms 254 and 256 may be operably coupled to respective ones of the operating triggers 62. Thus, for example, actuation of the operating trigger associated with the first pivot arm 254 may cause the first pivot arm 254 to pivot (e.g., in the direction or arrow 260) and carry the first pawl 250 out of contact with the first ring gear 246 to disengage the first pawl 250 so that the first ring gear 246 is not held and no torque is transmitted through the planetary gear inside the first ring gear 246 to the first spur gear 247. In such an example, the first ring gear 246 simply turns freely with the transmission shaft 240 and no torque is transmitted through the first transmission gear set 242. Thus, drive power is not provided to the first drive gear 200 (and the corresponding wheel 40, which is the first drivable component 122 in this example).

If the second pawl 252 remains engaged (e.g., in contact with) the second ring gear 248 while the first pawl 250 is disengaged from the first ring gear 246, the second drivable component 124 is driven and the first drivable component 122 is not driven. However, as discussed above, the STA 150 further provides braking of the first drivable component 122 while the drive power is removed from the first drivable component 122. Referring still to FIGS. 3-6, the first and second BAs 164 and 166 of FIG. 2 may be embodied by a braking gear, a flywheel and a brake band provided to correspond to each respective EA. FIGS. 5 and 6 show these components more clearly for the first BA 164, but it should be appreciated that mirrored components may be provided for the second BA 166 on the opposite side of the snow removal device 10 to correspond to the second EA 162 as shown in FIG. 4.

Referring primarily to FIG. 4, the first BA 164 may include a first braking gear 270 and the second BA 166 may include a second braking gear 272. The first BA 164 may also include a first flywheel 274 and a first brake band 280. The second BA 166 may include a second flywheel 276 and a second brake band 282. The first braking gear 270 and the first flywheel 274 may be operably coupled to (e.g., carried on) the common shaft 255. Similarly, second braking gear 272 and the second flywheel 276 may be operably coupled to (e.g., carried on) the common shaft 255. In some examples, the first braking gear 270 and the first flywheel 274 may be on a same side of the first pivot arm 254, and the first pawl 250 may be on the opposite side of the first pivot arm 254. Likewise, the second braking gear 272 and the second flywheel 276 may be on a same side of the second pivot arm 256, and the second pawl 252 may be on the opposite side of the second pivot arm 256. Moreover, the first and second pawls 250 and 252 may be located inwardly relative to their respective pivot arms (e.g., closer to the longitudinal centerline of the snow removal device 10), and the first and second braking gears 270 and 272 and the first and second flywheels 274 and 276 may be located outwardly relative to their respective pivot arms (e.g., closest to the chassis 15).

The first and second braking gears 270 and 272 may each be operably coupled to (e.g., engaged with) the first and second drive gears 200 and 210, respectively. Thus, when the first drive gear 200 rotates, the first braking gear 270 may normally rotate with the first drive gear 200 and correspondingly rotate the first flywheel 274. Similarly, when the second drive gear 210 rotates, the second braking gear 272 may normally rotate with the second drive gear 210 and correspondingly rotate the second flywheel 276.

In an example embodiment, a first portion (e.g., a first end) of the first brake band 280 may be operably coupled to (e.g., anchored at) the first pivot arm 254 at a first anchor point 286. A second portion (e.g., an opposite end) of the first brake band 280 may be operably coupled to (e.g., anchored at) the chassis 15 (e.g., to a sidewall of the chassis 15). When the first pawl 250 is engaged (or in the engaged state), the position of the first pivot arm 254 may be such that the first brake band 280 is not engaged with or in contact with the first flywheel 274. However, when the first pivot arm 254 is rotated to the disengaged position (e.g., in the direction of arrow 260), the first brake band 280 may be put into contact with (e.g., in frictional engagement with) a periphery of the first flywheel 274 and frictional forces may be generated therebetween. The frictional forces may tend to slow or stop rotation of the first flywheel 274 and thereby slow or stop rotation of the first braking gear 270. The slowing or stopping of the first braking gear 270 may then be coupled to the first drive gear 200 to slow or stop the first drive gear 200 and the first drivable component 122.

The second brake band 282 may be similarly anchored to selectively engage the second flywheel 276 when the second pivot arm 256 is rotated as the second pawl 252 is also rotated to the disengaged position. Accordingly, if either of the operating triggers 62 are operated, the corresponding drive gear will not only no longer receive drive power (based on disengagement of the corresponding pawl with its respective ring gear), but the same motion that disengages the pawl will also engage a brake to brake the corresponding drive gear (and thus also the corresponding wheel). Thus, the STA of example embodiments provides for operation (e.g., rotation) of a single component (e.g., the pivot arm) to cause both disengagement of drive power and activation of braking forces.

As can be appreciated from FIGS. 5 and 6, the first and second flywheels 274 and 276 are larger in diameter than the first and second braking gears 270 and 272. The first and second drive gears 200 and 210 are also larger in diameter than both the first and second flywheels 274 and 276 and the first and second braking gears 270 and 272. Accordingly, each of the first and second braking gears 270 and 272 turns faster than the first drive gear 200 and second drive gear 210, respectively. By employing this structure, the brake bands are enabled to stop the corresponding wheel or drivable component (by stopping the corresponding drive gear) with less braking torque.

Thus, a walk-behind, powered device in accordance with an example embodiment may include an engine, a mobility assembly operably coupled to the engine to provide mobility of the powered device responsive at least in part to operation of the engine, a working assembly operably coupled to the engine to perform a working function responsive at least in part to operation of the engine, and a drive assembly operably coupling the engine to the mobility assembly to selectively provide drive power to the mobility assembly. The mobility assembly includes a first drivable component and a second drivable component. The first and second drivable components may be disposed substantially at opposite sides of the powered device. The drive assembly is configured to selectively and independently provide power to the first and second drivable components. The drive assembly includes a short turning assembly configured to (e.g., based on component rotation, such as the first and second pawls, about a common shaft) cause both disengagement of drive power and activation of braking to the first drivable component while drive power is provided to the second drivable component.

The powered device (or drive assembly) of some embodiments may include additional features that may be optionally added either alone or in combination with each other. For example, in some embodiments, (1) the short turning assembly includes a first engagement assembly and a first braking assembly. In this example, a single component of the short turning assembly operates to disengage the first engagement assembly to cause the disengagement of the drive power to the first drivable component and actuate the first braking assembly to activate the braking of the first drivable component while a second braking assembly is disengaged and a second engagement assembly provides the drive power to the second drivable component. In an example embodiment, (2) the single component may be a pivot arm. The pivot arm may be operably coupled to both a brake band of the first braking assembly and a pawl that engages or disengages the first engagement assembly based on a position of the pivot arm. In some cases, (3) the drive assembly includes a transmission shaft operably coupled to a drive shaft of the mobility assembly. The drive shaft independently powers the first and second drivable components. The transmission shaft is operably coupled to a first transmission gear set and a second transmission gear set, each of which is operably coupled to respective ones of the first and second drivable components via respective first and second drive gears operably coupled to the drive shaft. The first and second transmission gear sets are configured to transmit the drive power to the first and second drive gears in response to the first and second transmission gear sets being in an engaged state. In response to the first transmission gear set being in a disengaged state, the short turning assembly simultaneously disengages the first transmission gear set and activates the braking to the first drivable component. In some examples, (4) the first and second transmission gear sets are each selectively transferable between the engaged and disengaged states based on engagement of a respective first pawl and second pawl with a corresponding first ring gear and second ring gear of the first and second transmission gear sets, respectively. In an example embodiment, (5) when the first pawl is engaged, the drive power is transferred from the transmission shaft through a first planetary gear inside the first ring gear to a first spur gear operably coupled to the first drive gear to drive the first drivable component responsive to engagement of the first pawl with the first ring gear, and when the second pawl is engaged, the drive power is transferred from the transmission shaft through a second planetary gear inside the second ring gear to a second spur gear operably coupled to the second drive gear to drive the second drivable component responsive to engagement of the second pawl with the second ring gear. In some cases, (6) an operating trigger is operably coupled to a pivot arm that is operably coupled to the first pawl, and the pivot arm pivots responsive to actuation of the operating trigger to disengage the first pawl and transfer the first transmission gear set to the disengaged state. In some examples, (7) the pivot arm is operably coupled to a first end of a brake band, and a second end of the brake band is operably coupled to a chassis of the powered device. In such an example, when the pivot arm pivots, the brake band operates to apply a braking force to the first drive gear. In an example embodiment, (8) the first drive gear is operably coupled to a braking gear that is operably coupled to a flywheel, and the brake band engages the flywheel to apply the braking force to the first drive gear. In some cases, (9) the flywheel is larger in diameter than the braking gear, and the braking gear turns faster than the first drive gear.

In some embodiments, any or all of the modifications of (1) to (9) may be employed and the first and second drivable components may be first and second wheels, respectively. Additionally or alternatively, the powered device may be a snow removal device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A walk-behind, powered device comprising:
an engine;
a mobility assembly operably coupled to the engine to provide mobility of the powered device responsive at least in part to operation of the engine;
a working assembly operably coupled to the engine to perform a working function responsive at least in part to operation of the engine; and
a drive assembly operably coupling the engine to the mobility assembly to provide drive power to the mobility assembly,
wherein the mobility assembly comprises a first drivable component and a second drivable component, the first and second drivable components being disposed substantially at opposite sides of the powered device,
wherein the drive assembly is configured to selectively and independently provide power to the first and second drivable components,
wherein the drive assembly comprises a short turning assembly configured to cause both disengagement of drive power and activation of braking to the first drivable component while drive power is provided to the second drivable component,
wherein the short turning assembly comprises a first engagement assembly and a first braking assembly, and wherein a single component of the short turning assembly rotates about a common shaft to:
disengage the first engagement assembly to cause the disengagement of the drive power to the first drivable component, and
actuate the first braking assembly to activate the braking of the first drivable component while a second braking assembly is disengaged and a second engagement assembly provides the drive power to the second drivable component, and
wherein the single component comprises a pivot arm, the pivot arm being operably coupled to both a brake band of the first braking assembly and a pawl that engages or disengages the first engagement assembly based on a position of the pivot arm.

2. The powered device of claim 1, wherein the drive assembly comprises a transmission shaft operably coupled to a drive shaft of the mobility assembly, the drive shaft independently powering the first and second drivable components,
wherein the transmission shaft is operably coupled to a first transmission gear set and a second transmission gear set, each of which is operably coupled to respective ones of the first and second drivable components via respective first and second drive gears operably coupled to the drive shaft,
wherein the first and second transmission gear sets are configured to transmit the drive power to the first and second drive gears in response to the first and second transmission gear sets being in an engaged state, and
wherein, in response to the first transmission gear set being in a disengaged state, the short turning assembly simultaneously disengages the first transmission gear set and activates the braking to the first drivable component.

3. The powered device of claim 1, wherein the first and second drivable components comprise first and second wheels, respectively.

4. The powered device of claim 1, wherein the powered device comprises a snow removal device.

5. A walk behind, powered device comprising;
an engine;
a mobility assembly operably coupled to the engine to provide mobility of the powered device responsive at least in part to operation of the engine;
a working assembly operably coupled to the engine to perform a working function responsive at least in part to operation of the engine; and
a drive assembly operably coupling the engine to the mobility assembly to provide drive power to the mobility assembly,
wherein the mobility assembly comprises a first drivable component and a second drivable component, the first and second drivable components being disposed substantially at opposite sides of the powered device,
wherein the drive assembly is configured to selectively and independently provide power to the first and second drivable components using a single component,
wherein the drive assembly comprises a short turning assembly configured to cause both disengagement of drive power and activation of braking to the first drivable component while drive power is provided to the second drivable component,
wherein the drive assembly comprises a transmission shaft operably coupled to a drive shaft of the mobility assembly, the drive shaft independently powering the first and second drivable components,
wherein the transmission shaft is operably coupled to a first transmission gear set and a second transmission gear set, each of which is operably coupled to respective ones of the first and second drivable components via respective first and second drive gears operably coupled to the drive shaft,
wherein the first and second transmission gear sets are configured to transmit the drive power to the first and second drive gears in response to the first and second transmission gear sets being in an engaged state,
wherein, in response to the first transmission gear set being in a disengaged state, the short turning assembly simultaneously disengages the first transmission gear set and activates the braking to the first drivable component and
wherein the first and second transmission gear sets are each selectively transferable between the engaged and disengaged states based on engagement of a respective first pawl and second pawl with a corresponding first ring gear and second ring gear of the first and second transmission gear sets, respectively.

6. The powered device of claim 5, wherein, when the first pawl is engaged, the drive power is transferred from the transmission shaft through a first planetary gear inside the first ring gear to a first spur gear operably coupled to the first drive gear to drive the first drivable component responsive to engagement of the first pawl with the first ring gear, and when the second pawl is engaged, the drive power is transferred from the transmission shaft through a second planetary gear inside the second ring gear to a second spur gear operably coupled to the second drive gear to drive the second drivable component responsive to engagement of the second pawl with the second ring gear.

7. The powered device of claim 6, wherein a remote actuator is operably coupled to a pivot arm that is operably coupled to the first pawl, and wherein the pivot arm pivots responsive to actuation of the remote actuator to disengage the first pawl and transfer the first transmission gear set to the disengaged state.

8. The powered device of claim 7, wherein the pivot arm is operably coupled to a first end of a brake band, and a second end of the brake band is operably coupled to a chassis of the powered device, and wherein, when the pivot arm pivots, the brake band operates to apply a braking force to the first drive gear.

9. The powered device of claim 8, wherein the first drive gear is operably coupled to a braking gear that is operably coupled to a flywheel, and wherein the brake band engages the flywheel to apply the braking force to the first drive gear.

10. The powered device of claim 9, wherein the flywheel is larger in diameter than the braking gear, and the braking gear turns faster than the first drive gear.

11. The powered device of claim 6, wherein the first and second pawls are operably coupled to a common shaft.

12. A drive assembly for a walk-behind, powered device, the drive assembly operably coupling an engine of the powered device to a mobility assembly to provide mobility of the powered device responsive at least in part to operation of the engine, the drive assembly comprising:
a transmission shaft selectively receiving drive power operably coupled from the engine to drive a first drivable component and a second drivable component of the mobility assembly, the first and second drivable components being disposed substantially at opposite sides of the powered device,
a short turning assembly configured to cause both disengagement of drive power and activation of braking to the first drivable component while drive power is provided to the second drivable component,
wherein the transmission shaft is operably coupled to a drive shaft of the mobility assembly, the drive shaft independently powering the first and second drivable components,
wherein the transmission shaft is operably coupled to a first transmission gear set and a second transmission gear set, each of which is operably coupled to respective ones of the first and second drivable components via respective first and second drive gears operably coupled to the drive shaft,
wherein the first and second transmission gear sets are configured to transmit the drive power to the first and second drive gears in response to the first and second transmission gear sets being in an engaged state, and
wherein, in response to the first transmission gear set being in a disengaged state, the short turning assembly simultaneously disengages the first transmission gear set and activates the braking to the first drivable component, and
wherein the first and second transmission gear sets are each selectively transferable between the engaged and disengaged states based on engagement of a respective first pawl and second pawl with a corresponding first ring gear and second ring gear of the first and second transmission gear sets, respectively.

13. The drive assembly of claim 12, wherein the short turning assembly comprises a first engagement assembly and a first braking assembly, and wherein a single component of the short turning assembly operates to:
disengage the first engagement assembly to cause the disengagement of the drive power to the first drivable component, and
actuate the first braking assembly to activate the braking of the first drivable component while a second braking assembly is disengaged and a second engagement assembly provides the drive power to the second drivable component.

14. The drive assembly of claim 12, wherein, when the first pawl is engaged, the drive power is transferred from the transmission shaft through a first planetary gear inside the first ring gear to a first spur gear operably coupled to the first drive gear to drive the first drivable component responsive to engagement of the first pawl with the first ring gear, and when the second pawl is engaged, the drive power is transferred from the transmission shaft through a second planetary gear inside the second ring gear to a second spur gear operably coupled to the second drive gear to drive the second drivable component responsive to engagement of the second pawl with the second ring gear.

15. The drive assembly of claim 14, wherein a remote actuator is operably coupled to a pivot arm that is operably coupled to the first pawl, and wherein the pivot arm pivots responsive to actuation of the remote actuator to disengage the first pawl and transfer the first transmission gear set to the disengaged state.

16. The drive assembly of claim 15, wherein the pivot arm is operably coupled to a first end of a brake band, and a second end of the brake band is operably coupled to a chassis of the powered device, and wherein, when the pivot arm pivots, the brake band operates to apply a braking force to the first drive gear.

17. The drive assembly of claim 16, wherein the first drive gear is operably coupled to a braking gear that is operably coupled to a flywheel, and wherein the brake band engages the flywheel to apply the braking force to the first drive gear.

18. The drive assembly of claim 17, wherein the flywheel is larger in diameter than the braking gear, and the braking gear turns faster than the first drive gear.

19. The drive assembly of claim 14, wherein the first and second pawls are operably coupled to a common shaft.

20. A drive assembly for a walk-behind, powered device, the drive assembly operably coupling an engine of the powered device to a mobility assembly to provide mobility of the powered device responsive at least in part to operation of the engine, the drive assembly comprising:
  a transmission shaft selectively receiving drive power operably coupled from the engine to drive a first drivable component and a second drivable component of the mobility assembly, the first and second drivable components being disposed substantially at opposite sides of the powered device; and
  a short turning assembly configured to cause both disengagement of drive power and activation of braking to the first drivable component while drive power is provided to the second drivable component;
  wherein the short turning assembly comprises a first engagement assembly and a first braking assembly, and wherein a single component of the short turning assembly operates to:
    disengage the first engagement assembly to cause the disengagement of the drive power to the first drivable component, and
    actuate the first braking assembly to activate the braking of the first drivable component while a second braking assembly is disengaged and a second engagement assembly provides the drive power to the second drivable component, and
  wherein the single component comprises is a pivot arm, the pivot arm being operably coupled to both a brake band of the first braking assembly and a pawl that engages or disengages the first engagement assembly based on a position of the pivot arm.

21. The drive assembly of claim 20, wherein the transmission shaft is operably coupled to a drive shaft of the mobility assembly, the drive shaft independently powering the first and second drivable components,
  wherein the transmission shaft is operably coupled to a first transmission gear set and a second transmission gear set, each of which is operably coupled to respective ones of the first and second drivable components via respective first and second drive gears operably coupled to the drive shaft,
  wherein the first and second transmission gear sets are configured to transmit the drive power to the first and second drive gears in response to the first and second transmission gear sets being in an engaged state, and
  wherein, in response to the first transmission gear set being in a disengaged state, the short turning assembly simultaneously disengages the first transmission gear set and activates the braking to the first drivable component.

* * * * *